July 24, 1956
R. A. MAHAFFY
2,756,154
FOOD PACKAGE
Filed Oct. 7, 1952
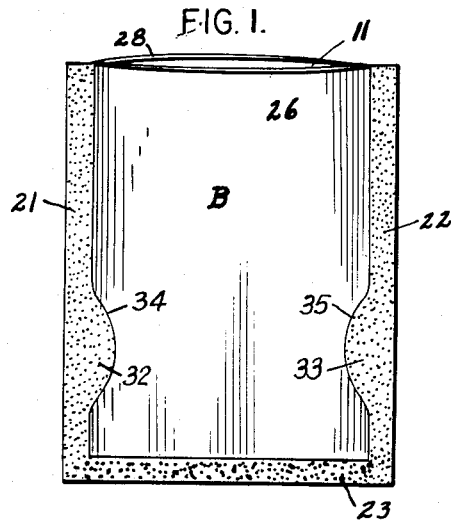
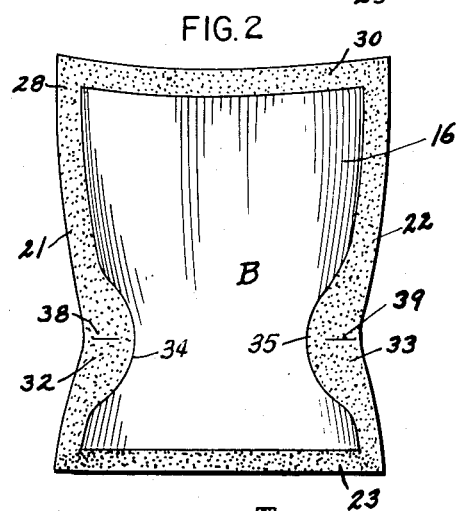
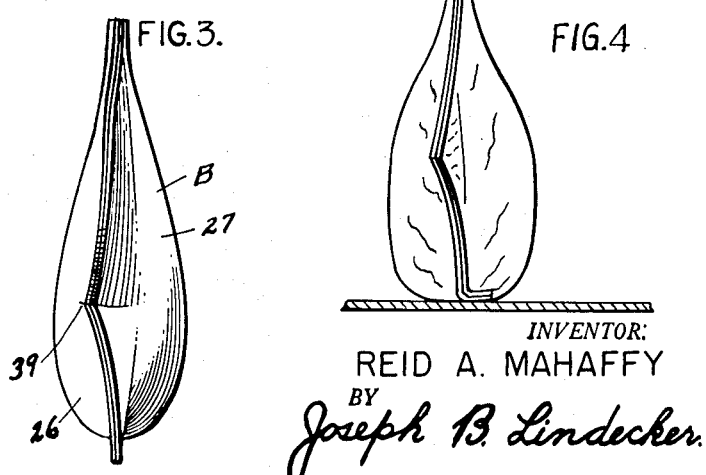
INVENTOR:
REID A. MAHAFFY
BY
Joseph B. Lindecker.
ATTORNEY.

United States Patent Office 2,756,154
Patented July 24, 1956

2,756,154
FOOD PACKAGE

Reid A. Mahaffy, Cedar Grove, N. J., assignor to Standard Packaging Corporation, New York, N. Y., a corporation of Virginia Application October 7, 1952, Serial No. 313,475

3 Claims. (Cl. 99—171)

This invention relates to flexible-walled containers employed for the storage, shipment and dispensing of such flowable materials as liquids or solids in powder or granular form.

The chief object of this invention is to produce a container especially suitable for the packaging of liquids and normally damp or wet commodities such as, for example, sauerkraut and the like.

In the packaging of dry solids in powder or granular form, or liquids, and wet commodities, containers and bags may be used provided the inner surface thereof is coated with some form of a liquid-proof coating preferably of the type which may be sealed by the application of heat and pressure, or by the application of heat alone. If desired, instead of using a coated material, a laminated sheet may be used providing that the ply of the sheet which is in contact with the commodity is made of moisture-proof material; as for example, a sheet of "Cellophane" laminated with a thermoplastic material used as "Pliofilm." Further, if desired a sheet of "Cellophane" may have an extruded film of polyethylene resin bonded thereto under heat and pressure while said polyethylene resin is at a temperature between 525° F. and 600° F.

The ordinary type of flexible-walled container of flat form with straight side seams and a straight seam across the bottom of the container, although desirable for certain purposes because of its comparative low cost of manufacture, has certain disadvantages, particularly when used for liquids or wet commodities. When such a container is filled with a commodity, the internal pressure within the container produces areas of high stress in the material of which the container is made. These areas occuring at one or more elevations within or adjacent to both side seams and tend to produce failure of the container by rupture and/or opening of the seam. These points or areas of high stress most often occur within or adjacent to the side seams at a location substantially one third the total height of the container from the bottom of said container. Horizontal lines or creases extend inwardly from the edge of the container toward the center thereof. Further, when the filled bag is placed in a vertical position and supported by a flat horizontal surface it has the tendency to bulge the side walls thereof outwardly due to the weight of the commodity, here again the bulging action of the side walls causes the seams or united edge portions of the bag to fold inwardly at a location above the bottom of the container resulting in the rupture at the transition between the sealed and unsealed portions. These highly stressed points and areas described above arise from internal pressure of the fluid type commodity of whatever origin and the counteracting forces developed within the package structure to resist the internal pressure thereof.

A typical practical example of the above occurs when a filled container of the type described is supported by a flat horizontal surface, such as a conveyor belt, or by resting on the inside flat horizontal bottom of a secondary outer container. Under such conditions the faces of the packages tend to bulge outward while the side seams tend to buckle inwardly. Said package tends to form a teardrop shaped package while the ends thereof are forced to retain their essentially flat shape due to the structure of the package and the relative inelasticity of the packaging material.

One object of the present invention is to provide a flexible-walled container which eliminates the disadvantages referred to, and which is very inexpensive to manufacture.

Another object is to provide a container which is made from a sheet, or sheets, of flexible material having its side longitudinal opposed edges formed with a new and improved design and sealed together for effectively withstanding seal disruptive pressures of the contents of the container during storage and transportation.

As a feature of the present invention, I employ a vertically arranged flexible-walled container of flat form and open at the top. Said container being provided across the bottom thereof with a straight seam, and provided along the vertical side edges with a seam having an enlarged portion arranged at a location substantially one-third its total height from the bottom of the container, said enlarged portion being convexly curved with relation to the outside vertical edge of said container. By means of this construction, the effect of the pressure of the contents is more evenly distributed along the entire length of the seam, the seam being reinforced at the location of disruptive pressure of the contents. After the container is charged, the top opening is sealed with a straight seam so that both ends will be provided with similar seams. A filled container so formed can be lifted, stored and shipped without breaking the side seams.

Various other objects, features and advantages of the invention will be apparent from the following particular decription and from an inspection of the accompanying drawing in which:

Figure 1 is a front elevation of a container embodying the present invention and shown in collapsed condition prior to being filled with a liquid or wet commodity.

Figure 2 shows the container described in Figure 1, filled with a commodity and sealed at the top thereof.

Figure 3 is an end view of Figure 2.

Figure 4 is an end view of a filled container supported upon a horizontal surface.

Referring to the drawing, the container B shown is made of sheet material, the inner layers or coating of which material are of such material that when such inner layers are superposed and pressed together under heat, they will weld, vulcanize or hermetically unite. As an example of such material, I may employ for the inner layer a type of thin, flexible, transparent, slightly elastic, impervious material sold under the name of "Pliofilm" laminated to an outer layer of moisture-proof, cellulosic material of the type sold under the trade name "cellophane." Further, if desired the container may be made of an outer layer of "cellophane" having an extruded film of polyethylene resin bonded to one side thereto under heat and pressure while said polyethylene resin is at a temperature between 525° F. and 600° F.

When the container B, embodying the present invention, is sealed by a top seam 30 after it is filled with a granular, or liquid, or wet commodity, said container will bulge as shown by Figure 3. The side seams 21 and 22 are provided with enlarged portions 32 and 33, said enlarged portions are convexly curved with relation to the outside vertical edge of the container as shown at 34 and 35. Even with the bulging action of the side walls and associated distortion phenomena as shown by Figure 3, the seams 32 and 33 will not be severely stressed, the stresses in the package faces are more evenly distributed as shown by Figure 2. The container B as shown will only show slight fold marks or wrinkles as shown by 38 and 39 and will not be so apt to fail under conditions of moving, handling, storage and shipment as its predecessor. The enlarged areas 34 and 35, or seals are substantially semi-elliptical in shape and are formed by a heating element shaped in accordance with the desired shape of the side seams of the container. The heat-sealing operation causes the opposed inner layers of the container to be autogenously bonded together as shown by Figures 1 and 2, and forms a hermetic seal and side seam with enlarged portion which is effective in withstanding internal pressures.

It will be readily understood that the present invention could be advantageously applied at one or more places along the side seals, or at one or more places in the top seal, since similar points and areas of high stress can develop in the package, should the package be rotated so that one of the side seams should act as the bottom seam.

Broadly considered, the present invention also contemplates the placing of a filled flexible container within a mold, the container being filled before or after it is so placed, thereafter subjecting the container and the mold to a vacuum action whereby the air will be evacuated from the mold and the container, then sealing the container while subjected to this vacuum action, and thereafter breaking the vacuum prior to removing the container from the mold, whereby the air at atmospheric pressure will act between the contiguous walls of the mold and the container pressing the container walls into direct contact with the commodity packed within the container. Said containers may be sealed under vacuum and uniformly shaped and sized by other types of machines if it is so desired. A simple and rapid operation with a machine having few parts is most desirable.

This sanitary flexible-walled container being pliable, yet strong and durable due to the reinforced seams thereof, may serve as a permanent container for the commodity, as such a container will not be damaged or destroyed under the ordinary handling to which such articles are usually subjected.

It will be understood, of course, that the present invention is not limited in its application merely to flexible bags or flexible containers but contemplates all related seam structures wherever the sense permits. It is contemplated that any suitable type of bag or other article can so be heat-sealed whether it be flat or envelope type, or even gusset type bags made on machines running a continuous web instead of blanks. The invention resides in a reinforced seam and seal construction as indicated by the foregoing description and is intended to cover any seam construction wherever the same is applicable.

Since, it will thus be seen that the objects hereinbefore set forth may readily and efficiently be obtained, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A commodity package containing a fluent-type food, including a flexible container having an improved structure to prevent rupture of its vertical seams when its opposed walls bulge outwardly and its side seams buckle inwardly forming a teardrop shaped package due to the internal pressure of the fluent contents, the container having spaced opposed walls formed of flexible and heat sealable material, said container having a fluent-type food commodity sealed therein and forming a substantially rectangular package, said container having top and bottom sealed seams, said container having substantially rectangular side sealed seams which are narrow with relation to their length, said side seams having enlarged sealed areas located between the bottom of the package and its midsection, and said enlarged portions having their inner edge portions curved convexly with relation to the outer edge portions of their side seams.

2. A commodity package containing a fluent-type food, including a flexible bag type container comprising an improved structure to prevent rupture of its vertical seams when its opposed walls bulge outwardly and its side seams buckle inwardly forming a teardrop shaped package due to the internal pressure of its fluent-type food contents, said container having spaced opposed walls of flexible laminated sheet material, said walls having an inner impervious thermoplastic layer and an outer reinforcing layer, said container having a fluent-type food commodity sealed therein, the edges of the inner thermoplastic layers being autogenously bonded together lengthwise along the side edges of said walls and transversely across the top and bottom edges of said walls to form side and top and bottom seams, said side seams being substantially rectangular and each having an enlarged sealed area located substantially one-third the length of the container above the bottom thereof, and said enlarge sealed areas having their inner edge portions curved convexly with respect to the outer side edge of the container.

3. A commodity package including a flexible container comprising an improved structure to prevent rupture of its vertical seams when its opposed walls bulge outwardly and its side seams buckle inwardly forming a teardrop shaped package due to the internal pressure of its fluent-type food contents, the container having spaced opposed walls formed of flexible and sealable material, said container being evacuated and having a fluent-type food commodity sealed therein and forming a substantially rectangular package, said container having substantially rectangular side sealed seams which are narrow with relation to their length, said seams having enlarged sealed areas located between the bottom of the package and its midsection, and said enlarged portions having their inner edge portions curved convexly with relation to the outer edge portions of their side seams.

References Cited in the file of this patent
UNITED STATES PATENTS

| Number | Name | Date |
| --- | --- | --- |
| 1,975,253 | Connolly | Oct. 2, 1934 |
| 2,230,849 | Salfisberg | Feb. 4, 1941 |
| 2,237,327 | Bell | Apr. 8, 1941 |
| 2,298,419 | Salfisberg | Oct. 13, 1942 |
| 2,329,360 | Salfisberg | Sept. 14, 1943 |
| 2,344,369 | Salfisberg | Mar. 14, 1944 |
| 2,354,590 | Gilfillan et al. | July 25, 1944 |
| 2,488,212 | Lloyd | Nov. 15, 1949 |
| 2,584,633 | Southwick | Feb. 5, 1952 |